3,525,733
WATER-INSOLUBLE MONOAZO COMPOUNDS CONTAINING AN ANILINE COUPLING COMPONENT SUBSTITUTED BY BOTH AN ACYLAMIDO GROUP AND A DICARBOXIMIDO GROUP
Max A. Weaver and James M. Straley, Kingsport, Tenn., assignors to Eastman Kodak Company, Rochester, N.Y., a corporation of New Jersey
No Drawing. Filed May 9, 1967, Ser. No. 637,060
Int. Cl. C09b 62/66, 62/82; D06b 1/38
U.S. Cl. 260—152
16 Claims

ABSTRACT OF THE DISCLOSURE

Water-insoluble monoazo compounds, prepared by diazotizing an aniline compound, a 2-aminothiazole, or a 2-aminobenzothiazole and coupling the resulting diazonium with an aniline compound having an acylamido group and a dicarboximido group, produce dyeings ranging from yellow to blue hydrophobic textile materials. The compounds exhibit improved fastness properties such as fastness to light and resistance to sublimation on polyester fibers.

---

This invention relates to certain novel water-insoluble monoazo compounds and, more particularly, to water-insoluble monoazo compounds useful as dyes for hydrophobic textile materials and to hydrophobic textile materials dyed with such compounds.

The novel water-insoluble monoazo compounds of the invention have the general formula (I)

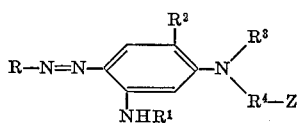

wherein:

R represents a phenyl radical, a 2-thiazolyl radical, or a 2-benzothiazolyl radical;

$R^1$ represents a lower alkanoyl radical, a cycloalkylcarbonyl radical, a benzoyl radical, an alkoxycarbonyl radical, a cycloalkoxycarbonyl radical, a phenoxycarbonyl radical, a lower alkylsulfonyl radical, a phenylsulfonyl radical, carbamoyl, an N-lower alkylcarbomoyl radical, or an N-phenylcarbamoyl radical;

$R^2$ represents hydrogen, lower alkyl, lower alkoxy, or halogen;

$R^3$ represents hydrogen, lower alkyl, or cycloalkyl;

$R^4$ represents a lower alkylene radical; and

Z represents a dicarboximido radical.

The novel compounds of the invention are useful as dyes for hydrophobic textile materials such as polyester, polyamide, and cellulose acetate textile fibers, yarns, and fabrics. The compounds of the invention impart fast dyeings of red to blue shades on the described textile materials when applied thereto according to well-known procedures.

Azo dyes having a dicarboximido group are described in U.S. Pats. 3,148,178; 3,148,180; and 3,161,631. However, the specific compounds described in those patents do not disclose the presence of the group —$NHR^1$ on the p-phenylene ring of the coupling component. It has been discovered that the group —$NHR^1$ of the compounds of the invention renders the compounds superior to those disclosed in the prior art. More specifically, it has been found that the compounds of the invention possess fastness properties superior to the fastness properties of the compounds disclosed in the patents mentioned hereinbefore. The compounds of the invention in general exhibit improved fastness to sublimation and/or light fastness when used as dyes on hydrophobic textile materials. The former fastness property is of particular importance in the dyeing of polyester textile materials which are often submitted to high temperatures, for example, in heat setting operations, in the thermal fixation technique of dyeing and in permanent pleating processing.

Typical groups represented by R include phenyl, p-nitrophenyl, p-chlorophenyl, o-chloro-p-nitrophenyl, o-methylsulfonyl-p-nitrophenyl, 2,6-dichloro-4-nitrophenyl, p-acetylphenyl, p-cyanophenyl, p-methylphenyl, p-sulfamoylphenyl, p-acetamidophenyl, o-p-dimethylsulfonylphenyl, 2,4-dinitro-6-chlorophenyl, p-ethoxycarbonylphenyl, 2-thiazolyl, 5-nitro-2-thiazolyl, 5-bromo-2-thiazolyl, 5-thiocyanato-2-thiazolyl, 4-trifluoromethyl-2-thiazolyl, 4-ethoxycarbonyl-2-thiazolyl, 5-cyano-2-thiazolyl, 5-acetamido-2-thiazolyl, 4-methylsulfonyl-2-thiazolyl, 4-methyl-5-nitro-2-thiazolyl, 2-benzothiazolyl, 6-methylsulfonyl-2-benzothiazolyl, 6-cyano-2-benzothiazolyl, 6-sulfamoyl-2-benzothiazolyl, 6-N,N-dimethylsulfamoyl - 2 - benzothiazolyl, 4,6-dichloro-2-benzothiazolyl, 4 - methyl-6-nitro-2-benzothiazolyl, etc.

Preferred groups represented by R have the general formula

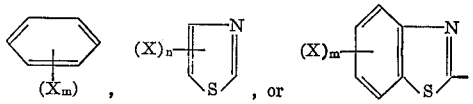

wherein X represents hydrogen, alkyl, substituted alkyl, alkoxy, alkanoylamino, nitro, halogen, cyano, alkylsulfonyl, substituted alkylsulfonyl, carbamoyl, N-alkylcarbamoyl, N,N-dialkylcarbamoyl, benzamido, alkoxycarbonyl, hydroxy, alkanoyl, alkylsulfonamido, sulfamoyl, N-alkylsulfamoyl, N,N-dialkylsulfamoyl, thiocyanato, alkylthio, phenoxy, etc., m represents 1, 2, or 3 and n represents 1 or 2. When m or n is more than 1, the substituents represented by X can be the same or different.

The alkyl and alkoxy groups which X can represent can contain up to about 8 carbon atoms and can be straight or branch chain, unsubstituted or substituted. Examples of the alkyl and alkoxy groups that X can represent are methyl, ethyl, propyl, isopropyl, butyl, isobutyl, amyl, hexyl, 2-ethylhexyl, octyl, methoxy, ethoxy, propoxy, butoxy, hexoxy, etc. Typical substituted alkyl groups represented by X include haloalkyl, e.g. 2-chloroethyl, trifluoromethyl; cyanoalkyl, e.g. 2-cyanoethyl; nitroalkyl, e.g. 2-nitroethyl; hydroxyalkyl, e.g. 2-hydroxyethyl, 2,3-dihydroxypropyl; etc. Preferred alkyl and alkoxy groups that X can represent are lower alkyl and lower alkoxy, i.e. having up to about 4 carbon atoms.

Bromine and chlorine are typical of the halogen atoms that X can represent. The alkanoyl and alkanoylamino groups which X can represent can contain up to about 8 carbon atoms. Examples of such alkanoyl and alkanoylamino groups are acetyl, propionyl, butyryl, acetamido, propionamido, butyramido. Preferred alkanoyl and alkanoylamino groups contain up to about 4 carbon atoms.

The alkylsulfonyl and alkylsulfonamido groups that X can represent can contain up to about 8 carbon atoms, and preferably up to about 4 carbon atoms such as for example, methylsulfonyl, ethylsulfonyl, propylsulfonyl, butylsulfonyl, 2-cyanoethylsulfonyl, methylsulfonamido, ethylsulfonamido, butylsulfonamido, etc. The alkoxycarbonyl groups represented by X can contain up to about 9 carbon atoms, preferably up to about 5 carbon atoms. Examples of the alkoxycarbonyl groups include methoxycarbonyl, ethoxycarbonyl, propoxycarbonyl, butoxycarbonyl, etc.

The alkyl groups on the substituted carbamoyl and sulfamoyl groups that X can represent can contain up to about 4 carbon atoms such as, for example, methyl, ethyl, propyl, isopropyl, butyl, etc. The alkylthio groups which X can represent can contain up to about 8 carbon atoms such as, for example, methylthio, ethylthio, propylthio, butylthio, hexylthio, etc. Such alkylthio groups are preferably lower thioalkyl.

The lower alkyl moiety of the alkanoyl radical represented by $R^1$ can be straight or branched chain, unsubstituted or substituted alkyl. Examples of the unsubstituted alkanoyl groups include formyl, acetyl, propionyl, butyryl, isobutyryl, etc. Typical substituted alkanoyl groups that $R^1$ can represent are lower cyanoalkanoyl, e.g. cyanoacetyl, lower hydroxyalkanoyl, e.g. hydroxyacetyl, β-hydroxypropionyl; lower haloalkanoyl, e.g. chloroacetyl, β-bromopropionyl; lower alkanoyloxyalkanoyl, e.g. acetoxyacetyl; lower alkoxyalkanoyl, e.g. β-methoxypropionyl; etc. Cyclohexylcarbonyl and lower alkyl substituted cyclohexylcarbonyl are examples of the cycloalkylcarbonyl radicals that $R^1$ can represent. Methoxycarbonyl, ethoxycarbonyl, propoxycarbonyl, isopropoxycarbonyl, butoxycarbonyl, etc. are examples of the lower alkoxycarbonyl radicals that $R^1$ can represent.

The benzoyl and phenoxycarbonyl radicals represented by $R^1$ can be unsubstituted or substituted, for example, with lower alkyl, lower alkoxy, halogen or nitro. Examples of such substituted benzoyl and phenoxycarbonyl groups include p-toluoyl, p-anisoyl, p-chlorobenzoyl, o-bromo-p-ethylbenzoyl, m-nitrobenzoyl, p-methylphenoxycarbonyl, p-methoxyphenoxycarbonyl, p-chlorophenoxycarbonyl, o,p - dichlorophenoxycarbonyl, p - nitrophenoxycarbonyl, etc. The alkyl moiety of the alkylsulfonyl and N-alkylcarbamoyl groups represented by $R^1$ can be straight or branch chain alkyl such as, for example, methyl, ethyl, propyl, isopropyl, butyl, isobutyl, etc. The phenyl moiety of the phenylsulfonyl and phenylcarbamoyl groups represented by $R^1$ can be unsubstituted phenyl or phenyl substituted, for example, with lower alkyl, lower alkoxy, halogen, nitro, etc. Examples of these groups include methylsulfonyl, ethylsulfonyl, phenylsulfonyl, p-tolylsulfonyl, N-methylcarbamoyl, N-propylcarbamoyl, N-phenylcarbamoyl, N-p-anisylcarbamoyl, N-p-chlorophenylcarbamoyl, etc.

Specific examples of the lower alkyl and lower alkoxy groups and the halogen atoms which $R^2$ can represent are set forth above in the preceding definition of X.

$R^3$ can represent hydrogen or an alkyl group of up to about 8 carbon atoms, straight or branch chain, unsubstituted or substituted. Examples of the unsubstituted alkyl groups represented by $R^3$ are set forth in the preceding definition of X. Examples of the substituted alkyl groups that $R^3$ can represent are hydroxyalkyl, e.g. 2-hydroxyethyl; polyhydroxyalkyl, e.g. 2,3-dihydroxypropyl; alkoxyalkyl, e.g. 2-methoxyethyl; cyanoalkyl, e.g. 2-cyanoethyl; cyanoalkoxyalkyl, e.g. 2-cyanoethoxyethyl; alkanoyloxyalkyl, e.g. 2-acetoxyethyl; alkoxycarbonylalkyl, e.g. 2-ethoxycarbonylethyl; haloalkyl, e.g. 2-chloroethyl, 3-chloropropyl, 2-bromoethyl; hydroxyhaloalkyl, e.g. 3-chloro-2-hydroxypropyl; alkylsulfonylalkyl, e.g. 2-methylsulfonylethyl; alkoxycarbonyloxyalkyl, e.g. 2-methoxycarbonyloxyethyl; carbamoylalkyl, e.g. 2-carbamoylethyl; benzyl; phenoxyalkyl, e.g. 2-phenoxyethyl; alkylsulfonamidoalkyl, e.g. 2-methylsulfonamidoethyl; N-alkylcarbamoylalkyl, e.g. 2-N-ethylcarbamoylethyl; etc. Preferably, the alkyl moiety, if any, of the substituents on the substituted alkyl groups represented by $R^2$ and $R^3$ have up to about four carbon atoms, e.g. lower alkoxy, lower alkylsulfonyl, etc. Cyclohexyl is typical of the cycloalkyl groups represented by $R^3$.

The alkylene radical represented by $R^4$ can be straight or branched chain, unsubstituted or substituted alkylene of up to about 4 carbon atoms. Examples of the alkylene groups represented by $R^3$ are ethylene, propylene, isopropylene, n-butylene, isobutylene, haloalkylene, e.g. 2-chloropropylene, 2-bromopropylene, chloroethylene, hydroxyalkylene, e.g. 2-hydroxypropylene, hydroxyethylene, lower alkanoyloxyalkylene, e.g. 2-acetoxypropylene, etc.

Typical dicarboximido groups represented by Z include succinimido; phthalimido; halophthalimido, e.g. tetrachlorophthalimido; tetrahydrophthalimido; hexahydrophthalimido; nitrophthalimido, e.g. 3-nitrophthalimido; lower alkylphthalimido, e.g. 3-methylphthalimido; aminophthalimido, e.g. 3-aminophthalimido; glutarimido; bicyclo[2.2.1]-5-heptene-2,3-dicarboximido; 1,8 - naphthalimido; citraconimido; cycloalkanedicarboximido such as

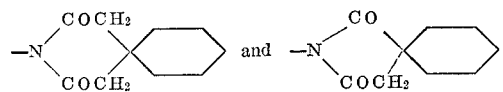

The dicarboximido group Z can be characterized further by the formula

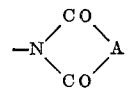

wherein A represents the carbon atoms, which with the imido nitrogen atom and the carbonyl carbon atoms, complete a ring of 5 to 6 atoms. Typical of the divalent group represented by A is alkylene of 2 to 3 carbon atoms, e.g. ethylene, propylene and lower alkyl substituted derivatives thereof, e.g. isopropylene, isobutylene, 2,3-butylene, etc. A can also represent vinylene, e.g. maleimido, lower alkyl substituted vinylene, e.g. citraconimido, o-phenylene, cyclohexyl-1,3-diyl, etc.

Preferred water-insoluble monoazo compounds of the invention having Formula I are those in which R represents a group having the formula

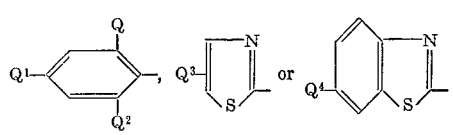

wherein Q, $Q^1$ and $Q^2$ are the same or different and each represents cyano, hydrogen, nitro, halogen, lower alkanoyl, lower alkylsulfonyl, or sulfamoyl; $Q^3$ represents nitro, halogen, cyano, or alkylsulfonyl; $Q^4$ represents nitro, cyano, lower alkylsulfonyl, lower alkoxycarbonyl, or thiocyanato;

$R^1$ represents lower alkanoyl, lower alkoxycarbonyl, lower alkylsulfonyl; phenylsulfonyl, phenylsulfonyl in which the phenyl group is substituted with lower alkyl, or lower N-alkylcarbamoyl;

$R^2$ represents hydrogen, lower alkyl or lower alkoxy;

$R^3$ represents lower alkyl or lower alkyl substituted with halogen, hydroxy, cyano, or lower alkanoyloxy;

$R^4$ represents lower alkylene, especially ethylene; and Z represents succinimido or phthalimido.

As is well known, the basic color of the novel monoazo compounds of the invention is attributable to the conjugation of the phenyl-, thiazolyl-, or benzothiazolyl-azoaniline nuclei. The primary usefulness of the compounds of the invention; i.e. as dyes, is not materially affected by the substituents present on the groups R, $R^3$, $R^4$ and Z. Such substituents serve primarily as auxochrome groups to vary the shade of the monoazo compounds.

The compounds of the invention are prepared in accordance with procedures well known in the art by diazotizing an amine having the formula (II)      $R-NH_2$ and coupling the diazonium salt with a coupling component having the formula (III)
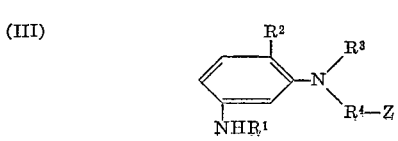

wherein R, R¹, R², R³, R⁴ and Z are defined above. The couplers of Formula III are prepared by nitrating an intermediate of the structure (IV)

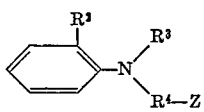

by well known techniques, for example, by treating intermediate (IV) with a mixture of nitric and sulfuric acids. The 5-nitro derivative of (IV) is then hydrogenated to the corresponding amine which is then acylated to yield the couplers of formula (III). Examples of acylating agents include acetic anhydride, propionic anhydride, cyclohexanecarbonyl chloride, methanesulfonyl chloride, ethyl chloroformate, benzoyl chloride and the like. Preparation of the intermediate of Formula IV is described in detail in U.S. Pat. 3,148,178.

The following examples will further illustrate the preparation of representative couplers and the monoazo compounds of the invention.

PREPARATION OF THE COUPLERS

Example 1

To 40 ml. conc. $H_2SO_4$ is added portionwise with stirring at about 25° C., 12.3 g. N-ethyl-N-β-succinimidoethylaniline. The solution is cooled and a nitrating mixture (prepared by adding 3.5 ml. conc. $H_2SO_4$ to 3.5 ml. conc. $NHO_3$(d.=1.42) is added at about 5° C. The reaction is stirred 1 hour and then drowned into 400 ml. ice-water mixture. The solid is collected by filtration (this is mostly the para isomer) and the filtrate is then neutralized with conc. ammonium hydroxide, being kept cold, to obtain the meta isomer which is then collected by filtration, washed with water, and air dried. After recrystallization from 2B alcohol the meta isomer melts at 98–100° C. It has the structure:

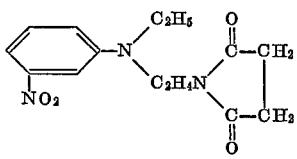

Example 2

5.5 g. N-ethyl-3-nitro-N - β - succinimidoethylaniline in 50 ml. 2B alcohol is hydrogenated, in the presence of Raney nickel catalyst at 75° C., to give the amino compound. The mixture from the autoclave is heated to boiling and then filtered to remove the Raney nickel. The amino compound separates from the cold filtrate and is collected by filtration and air dried. It melts at 131–132° C.

Example 3

Preparation of 3-acetamido-N-ethyl-N-β-succinimidoethylaniline. 2.61 g. N - ethyl - N - β - succinimidoethyl-M - phenylenediamine (from Example 2), 2.5 ml. acetic anhydride, and 15 ml. benzene are refluxed for 3 hours and then allowed to cool. The product is collected by filtration, washed with benzene and air dried. It melts at 139–141° C. and has the following structure:

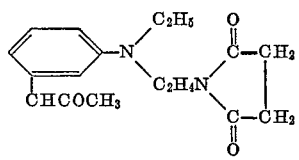

Example 4

Preparation of N - ethyl - 3 - propionamido - N - β-succinimidoethylaniline. 5.22 g. 3 - amino - N - ethyl-N - β - succinimidoethylaniline, 30 ml. benzene, and 3.4 g. propionic anhydride are reacted and the product isolated as in Example 3. The product melts at 170–171° C.

Example 5

Preparation of N - ethyl - 3 - methanesulfonamido-N - β - succinimidoethylaniline. 5.22 g. 3 - amino - N-ethyl - N - β - succinimidoethylaniline is dissolved in 40 ml. dry pyridine. To this is added 2.85 g. methanesulfonylchloride and the reaction heated at 75–80° C. for 1 hour. It is then drowned into water and the product collected by filtration, washed with water, and air dried. After one recrystallization from ethanol the product melts at 145.5–147° C. It has the structure:

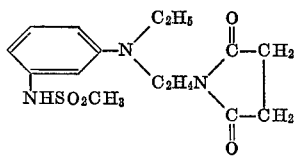

Example 6

3.91 g. 3 - amino - N - ethyl - N - β - succinimidoethylaniline, 25 ml. dry pyridine, and 2.16 g. ethyl chloroformate are reacted as described in Example 5 to give the following product:

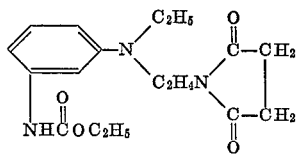

This material melts at 126–127° C.

Example 7

2.61 g. 3 - amino - N - ethyl - N - β - succinimidoethylaniline, 15 ml. dry pyridine, and 2.2 g. cyclohexanecarbonylchloride are reacted as in Example 5 to give the following coupler:

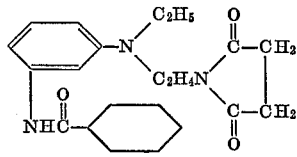

After recrystallization from ethanol the product melts at 148–150° C.

PREPARATION OF THE AZO COMPOUNDS

Example 8

To 2.9 g. of 2-amino-5-nitrothiazole, stirred in 25 cc. water, is added 13.6 cc. conc. $H_2SO_4$. Immediate solution results. The solution is cooled to −10° C. and a solution of 1.4 g. $NaNO_2$ in 10 cc. conc. $H_2SO_4$ is added below −5° C. Stirring at about −5° C. is continued for 15 minutes. This diazonium solution is then added to a chilled solution of 6.06 g. 3-acetamido-N-ethyl-N-β-succinimidoethylaniline in 150 ml. of 15% $H_2SO_4$. The temperature is kept at 0–5° C. for 30 minutes and then the coupling mixture is drowned with water. The dye is collected by filtration, washed with water, and air dried. The dye produces bright reddish-blue shades on cellulose acetate and polyester fibers. It has the following structure.

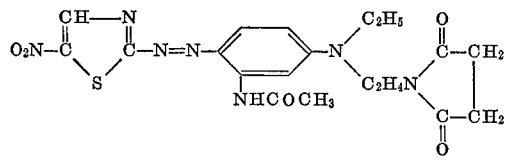

Example 9

1.45 g. 2-amino-5-nitrothiazole is diazotized as described in Example 8 and coupled with 3.17 g. of N-ethyl-3-propionamido-N-β-succinimidoethylaniline in 75 ml. of 15% $H_2SO_4$, all at about 0° C. The reaction mixture is allowed to stand 1 hour at about 5° C. and then is drowned with water. The product is collected by filtration, washed with water and air dried. The dye colors polyester fibers reddish-blue shades and has excellent fastness properties.

Example 10

1.45 g. 2-amino-5-nitrothiazole is diazotized and coupled with 3.33 g. of coupler from Example 6 in 75 ml. of 15% $H_2SO_4$, as described in Example 8, to yield the following product:

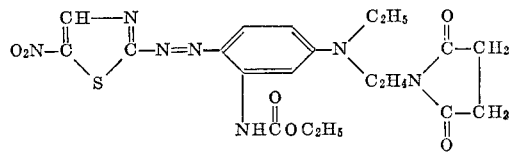

Example 11

1.45 g. 2-amino-5-nitrothiazole is diazotized and coupled with 3.33 g. of N-ethyl-N-β-succinimidoethyl-2-methoxy-5-acetamidoaniline in 75 ml. 15% $H_2SO_4$, as described in Example 8, to yield the following product:

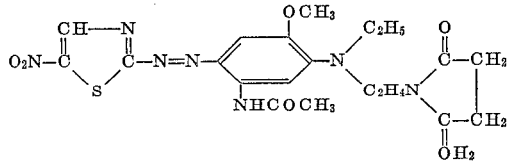

This dye colors cellulose acetate and polyester fibers greenish-blue shades.

The azo compounds described in Table I are prepared by diazotizing 2-aminothiazoles and coupling the diazoniums with the coupling components of Formula III as described in Examples 8 through 11 and have the formula

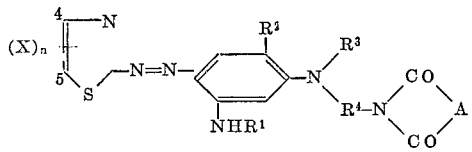

TABLE I

| Example No.: | $(X)_n$ | $R^1$ | $R^2$ | $R^3$ | $R^4$ | A | Color on polyesters |
|---|---|---|---|---|---|---|---|
| 12 | 5-NO$_2$ | —COCH$_3$ | H | —C$_2$H$_5$ | —CH$_2$CH$_2$— | —CH$_2$CH$_2$CH$_2$— | Blue. |
| 13 | 5-NO$_2$ | —COCH$_3$ | H | —C$_2$H$_5$ | —CH$_2$CH$_2$— | (phenyl) | Do. |
| 14 | 5-NO$_2$ | —COCH$_3$ | H | —C$_2$H$_5$ | —CH$_2$CH$_2$— | (cyclohexyl) | Do. |
| 15 | 5-NO$_2$ | —COCH$_3$ | H | —C$_2$H$_5$ | —CH$_2$CH$_2$— | (phenyl)—Cl | Do. |
| 16 | 5-NO$_2$ | —COCH$_3$ | H | —C$_2$H$_5$ | —CH$_2$CH$_2$— | (phenyl)—CH$_3$ | Do. |
| 17 | 5-NO$_2$ | —COCH$_3$ | H | —C$_2$H$_5$ | —CH$_2$CH$_2$— | —CH=CH— | Do. |
| 18 | 5-NO$_2$ | —COCH$_3$ | H | —C$_2$H$_5$ | —CH$_2$CH$_2$— | —CH=C(CH$_3$)— | Do. |
| 19 | 5-NO$_2$ | —COCH$_3$ | H | —C$_2$H$_5$ | —CH$_2$CH$_2$— | —CH(CH$_3$)—CH$_2$— | Do. |
| 20 | 5-NO$_2$ | —COCH$_3$ | H | —C$_2$H$_5$ | —CH$_2$CH$_2$— | (cyclohexyl with CH$_2$) | Do. |
| 21 | 5-NO$_2$ | —CO—(phenyl) | H | —C$_2$H$_5$ | —CH$_2$CH$_2$— | —CH$_2$CH$_2$— | Do. |
| 22 | 5-NO$_2$ | —CO—(cyclohexyl) | H | —C$_2$H$_5$ | —CH$_2$CH$_2$— | —CH$_2$CH$_2$— | Do. |
| 23 | 5-NO$_2$ | —SO$_2$CH$_3$ | H | —C$_2$H$_5$ | —CH$_2$CH$_2$— | —CH$_2$CH$_2$— | Do. |
| 24 | 5-NO$_2$ | —COCH$_2$OH | H | —C$_2$H$_5$ | —CH$_2$CH$_2$— | —CH$_2$CH$_2$— | Do. |
| 25 | 5-NO$_2$ | —COCH$_2$Cl | H | —C$_2$H$_5$ | —CH$_2$CH$_2$— | —CH$_2$CH$_2$— | Do. |
| 26 | 5-NO$_2$ | —COCH$_2$OCH$_3$ | H | —C$_2$H$_5$ | —CH$_2$CH$_2$— | —CH$_2$CH$_2$— | Do. |
| 27 | 5-NO$_2$ | —COOCH$_3$ | H | —C$_2$H$_5$ | —CH$_2$CH$_2$— | —CH$_2$CH$_2$— | Do. |
| 28 | 5-NO$_2$ | —COO—(phenyl) | H | —C$_2$H$_5$ | —CH$_2$CH$_2$— | —CH$_2$CH$_2$— | Do. |

3,525,733

TABLE I—Continued

| Example No.: | (X)ₙ | R¹ | R² | R³ | R⁴ | A | Color on polyesters |
|---|---|---|---|---|---|---|---|
| 29 | 5-NO₂ | —COC₂H₄Cl | H | —C₂H₅ | —CH₂CH₂— | —CH₂CH₂— | Do. |
| 30 | 5-NO₂ | —COCH₂CN | H | —C₂H₅ | —CH₂CH₂— | —CH₂CH₂— | Do. |
| 31 | 5-NO₂ | —SO₂C₂H₅ | H | —C₂H₅ | —CH₂CH₂— | —CH₂CH₂— | Do. |
| 32 | 5-NO₂ | —SO₂—⟨C₆H₅⟩ | H | —C₂H₅ | —CH₂CH₂— | —CH₂CH₂— | Do. |
| 33 | 5-NO₂ | —SO₂—⟨C₆H₅⟩ | H | —C₂H₅ | —CH₂CH₂— | —CH₂CH₂— | Do. |
| 34 | 5-NO₂ | —COH | H | —C₂H₅ | —CH₂CH₂— | —CH₂CH₂— | Do. |
| 35 | 5-NO₂ | —CONH₂ | H | —C₂H₅ | —CH₂CH₂— | —CH₂CH₂— | Do. |
| 36 | 5-NO₂ | —CONHC₂H₅ | H | —C₂H₅ | —CH₂CH₂— | —CH₂CH₂— | Do. |
| 37 | 5-NO₂ | —CONHC₆H₅ | H | —C₂H₅ | —CH₂CH₂— | —CH₂CH₂— | Do. |
| 38 | 5-NO₂ | —COC₃H₇ | H | —C₂H₅ | —CH₂CH₂— | —CH₂CH₂— | Do. |
| 39 | 5-NO₂ | —COCH₃ | —OCH₃ | —CH₃ | —CH₂CH₂— | —CH₂CH₂— | Do. |
| 40 | 5-NO₂ | —COOC₂H₅ | —OCH₃ | —C₂H₅ | —CH₂CH₂— | —CH₂CH₂— | Do. |
| 41 | 5-NO₂ | —SO₂CH₃ | —OCH₃ | —C₂H₅ | —CH₂CH₂— | —CH₂CH₂— | Do. |
| 42 | 5-NO₂ | —CO—⟨C₆H₅⟩ | —OCH₃ | —C₂H₅ | —CH₂CH₂— | —CH₂CH₂— | Do. |
| 43 | 5-NO₂ | —CO—⟨C₆H₅⟩ | —OCH₃ | —C₂H₄CN | —CH₂CH₂— | —CH₂CH₂— | Do. |
| 44 | 5-NO₂ | —COCH₃ | —OCH₃ | —C₂H₄OH | —CH₂CH₂— | —CH₂CH₂— | Do. |
| 45 | 5-NO₂ | —COCH₃ | —OCH₃ | —C₂H₄OCH₃ | —CH₂CH₂— | —CH₂CH₂— | Do. |
| 46 | 5-NO₂ | —COCH₃ | —OCH₃ | —CH₂CH(OH)—CH₂Cl | —CH₂CH₂— | —CH₂CH₂— | Do. |
| 47 | 5-NO₂ | —COCH₃ | —OCH₃ | —CH₂CH(OH)CH₂OCH₃ | —CH₂CH₂— | —CH₂CH₂— | Do. |
| 48 | 5-NO₂ | —COCH₃ | —CH₃ | —CH₂CH(OH)CH₂OCH₃ | —CH₂CH₂— | —CH₂CH₂— | Do. |
| 49 | 5-NO₂ | —COCH₃ | —CH₃ | —C₂H₅ | —CH₂CH₂— | —CH₂CH₂— | Do. |
| 50 | 5-NO₂ | —COCH₃ | —CH₃ | —C₂H₄OCOCH₃ | —CH₂CH₂— | —CH₂CH₂— | Do. |
| 51 | 5-NO₂ | —COCH₃ | —CH₃ | —C₂H₅ | —CH₂CH(OH)CH₂— | —CH₂CH₂— | Do. |
| 52 | 5-NO₂ | —COCH₃ | —CH₃ | —C₂H₅ | —CH₂CH(CH₃)— | —CH₂CH₂— | Do. |
| 53 | 5-CN | —COCH₃ | H | —C₂H₅ | —CH₂CH₂— | —CH₂CH₂— | Violet. |
| 54 | 5-CN | —COCH₃ | 2-OCH₃ | —C₂H₅ | —CH₂CH₂— | —CH₂CH₂— | Do. |
| 55 | 5-CONH₂ | —COCH₃ | 2-OCH₃ | —C₂H₅ | —CH₂CH₂— | —CH₂CH₂— | Do. |
| 56 | 5-SCN | —COCH₃ | 2-OCH₃ | —C₂H₅ | —CH₂CH₂— | —CH₂CH₂— | Do. |
| 57 | 5-Br | —COCH₃ | H | —C₂H₅ | —CH₂CH₂— | —CH₂CH₂— | Red. |
| 58 | 5-SO₂C₄H₉ | —COCH₃ | H | —C₂H₅ | —CH₂CH₂— | —CH₂CH₂— | Violet. |
| 59 | 5-SO₂C₂H₄CN | —COCH₃ | H | —C₂H₅ | —CH₂CH₂— | —CH₂CH₂— | Do. |
| 60 | None | —COCH₃ | H | —C₂H₅ | —CH₂CH₂— | —CH₂CH₂— | Red. |
| 61 | 4-C₆H₅ | —COCH₃ | H | —C₂H₅ | —CH₂CH₂— | —CH₂CH₂— | Red. |
| 62 | 4-CF₃ | —COCH₃ | H | —C₂H₅ | —CH₂CH₂— | —CH₂CH₂— | Red. |
| 63 | 4-NHCOCH₃ | —COCH₃ | H | —C₂H₅ | —CH₂CH₂— | —CH₂CH₂— | Red. |
| 64 | 5-COOC₂H₅ | —COCH₃ | H | —C₂H₅ | —CH₂CH₂— | —CH₂CH₂— | Red. |
| 65 | 4-CH₃ | —COCH₃ | H | —C₂H₅ | —CH₂CH₂— | —CH₂CH₂— | Red. |
| 66 | 4-COOC₂H₅, 5-NO₂ | —COCH₃ | H | —C₂H₅ | —CH₂CH₂— | —CH₂CH₂— | Blue. |
| 67 | 4-CH₃, 5-NO₂ | —COCH₃ | H | —C₂H₅ | —CH₂CH₂— | —CH₂CH₂— | Do. |

Example 68

0.72 g. NaNO₂ is added portionwise to 5 cc. conc. H₂SO₄. This solution is cooled and 10 ml. 1:5 acid (1 part propionic:5 parts acetic) is added below 15° C. This is stirred at about 5° C. and 1.72 g. 2-chloro-4-nitroaniline is added, followed by 10 cc. 1:5 acid. The diazotization is stirred at 0–5° C. for 3 hours and then added to a chilled solution of 3.03 g. 3-acetamido-N-ethyl-N-β-succinimidoethylaniline in 100 cc. 1:5 acid. The coupling is kept cold and neutralized to Congo Red paper with ammonium acetate. After coupling 2 hours, the mixture is drowned with water, filtered, washed with water, and air dried. The product dyes polyester fibers a deep shade of red with excellent light and sublimation fastness. It has the structure:

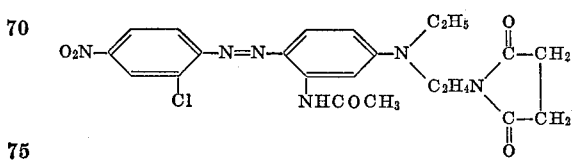

Example 69

1:53 g. of 2-cyano-4-nitroaniline is diazotized and coupled with 3.03 g. 3-acetamido-N-ethyl-N-β-succinimidoethylaniline in 100 ml, 1:5 acid as illustrated in Example 68. It has the structure:

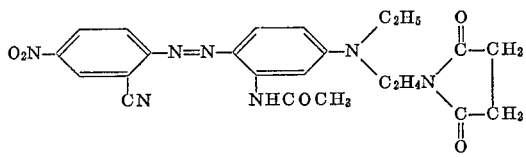

This dye produced deep violet shades when dyed on polyester fibers.

Example 70

2.16 g. 2-methylsulfonyl-4-nitroaniline was diazotized and coupled with 3.33 g. of the coupler from Example 6 in 100 ml. of 1:5 acid as described in Example 68.

The dye colors polyester fibers violet and has the structure:

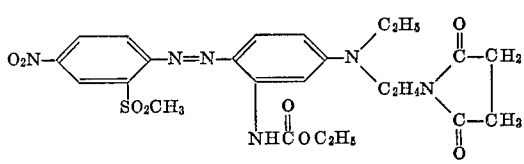

Example 71

6.9 g. p-nitroaniline is dissolved in 5.4 cc. conc. $H_2SO_4$ and 12.6 cc. water. This solution is poured onto 50 g. ice and then a solution of 3.6 g. $NaNO_2$ in 8 cc. water is added all at once. The diazotization is stirred at 5° C. for 1 hour and then added to a chilled solution of 15.2 g. 3 - acetamido-N-ethyl-N-β-succinimidoethylaniline in 250 ml. of 15% $H_2SO_4$. The coupling is neutralized with ammonium acetate until a test sample is neutral to Congo Red paper. After coupling 2 hours, the mixture is drowned with water. The product is collected by filtration, washed with water, and air dried. It has the following structure:

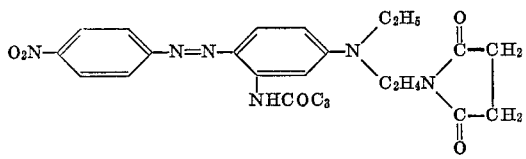

This dye produces bright scarlet shades on polyester fibers.

The monoazo compounds described in Table II are prepared by diazotizing an aniline compound of Formula II and coupling the diazonium obtained with a coupling component of Formula III according to the procedure described in Examples 68 through 71. The compounds described in the examples of Table II conform to the formula

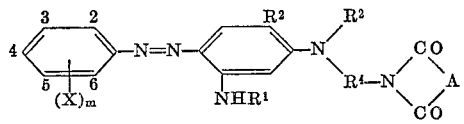

TABLE II

| Example No. | $(X)_m$ | $R^1$ | $R^2$ | $R^3$ | $R^4$ | A | Color on polyesters |
|---|---|---|---|---|---|---|---|
| 72 | 2-Cl-4-$NO_2$ | —$OOC_2H_5$ | H | —$C_2H_5$ | —$CH_2CH_2$— | —$CH_2CH_2$— | Red. |
| 73 | 2-Cl-4-$NO_2$ | —$SO_2CH_3$ | H | —$C_2H_5$ | —$CH_2CH_2$— | —$CH_2CH_2$— | Red. |
| 74 | 2-Cl-4-$NO_2$ | —$COOC_2H_5$ | H | —$C_2H_5$ | —$CH_2CH_2$— | —$CH_2CH_2$— | Red. |
| 75 | 2-Cl-4-$NO_2$ | —CO—⌬ | H | —$C_2H_5$ | —$CH_2CH_2$— | —$CH_2CH_2$— | Red. |
| 76 | 2-Cl-4-$NO_2$ | —CO—⌬ | —$OCH_3$ | —$C_2H_5$ | —$CH_2CH_2$— | —$CH_2CH_2$— | Red. |
| 77 | 2-Cl-4-$NO_2$ | —COO—⌬ | —$OCH_3$ | —$C_2H_5$ | —$CH_2CH_2$— | —$CH_2CH_2$— | Red. |
| 78 | 2-CN-4-$NO_2$ | —$COOC_3H_7$ | H | —$C_2H_5$ | —$CH_2CH_2$— | —$CH_2CH_2$— | Violet. |
| 79 | 2-CN-4-$NO_2$ | —$CONH_2$ | H | —$C_2H_5$ | —$CH_2CH_2$— | —$CH_2CH_2$— | Do. |
| 80 | 2-CN-4-$NO_2$ | —$CONHC_2H_5$ | H | —$CH_3$ | —$CH_2CH_2$— | —$CH_2CH_2$— | Do. |
| 81 | 2-CN-4-$NO_2$ | —$CONHC_2H_5$ | —$CH_3$ | —$C_2H_5$ | —$CH_2CH_2$— | —$CH_2CH_2$— | Do. |
| 82 | 4-$NO_2$ | —$COOC_2H_5$ | H | —$C_2H_5$ | —$CH_2CH_2$— | ⌬ | Scarlet. |
| 83 | 4-$NO_2$ | —$COCH_3$ | H | —$CH_3$ | —$CH_2CH_2CH_2$— | ⌬ | Do. |
| 84 | 4-$NO_2$ | —$COCH_3$ | H | —$C_2H_4CN$ | —$CH_2CH_2$— | ⌬ | Do. |
| 85 | 4-$NO_2$ | —$COCH_3$ | H | —$C_2H_4OCH_3$ | —$CH_2CH_2$— | —$CH_2CH_2CH_2$— | Do. |
| 86 | 4-$NO_2$ | —$COCH_2OCH_3$ | H | —$CH_2CH_3$— | —$CH_2CH_2$— | —$CH_2CH_2$— | Do. |
| 87 | 2-Cl-4,6-di-$NO_2$ | —$COCH_2OH$ | H | —$CH_2CH_3$— | —$CH_2CH_2$— | —$CH_2CH_2$— | Blue. |
| 88 | 2-Cl-4,6-di-$NO_2$ | —$COCH_2Cl$ | H | —$CH_2CH_3$— | —$CH_2CH_2$— | —$CH_2CH_2$— | Do. |
| 89 | 2-Cl-4,6-di-$NO_2$ | —$COCH_2CN$ | H | —$CH_2CH_3$— | —$CH_2CH_2$— | —$CH_2CH_2$— | Do. |
| 90 | 2-Cl-4,6-di-$NO_2$ | —$COCH_3$ | 2-$OCH_3$ | —$CH_2CH_3$— | —$CH_2CH_2$— | —$CH_2CH_2$— | Do. |
| 91 | 2-Cl-4,6-di-$NO_2$ | —$COCH_3$ | 2-$OCH_3$ | —$CH_2CH_3$— | —$CH_2CHCH_2$—<br>\|<br>OH | —$CH_2CH_2$— | Do. |
| 92 | 2-Cl-4,6-di-$NO_2$ | —$COCH_3$ | 2-$OCH_3$ | —$CH_2CHCH_2Cl$<br>\|<br>OH | —$CH_2CH_2$— | —$CH_2CH_2$— | Do. |
| 93 | 2-Cl-4,6-di-$NO_2$ | —$COCH_3$ | 2-$OCH_3$ | —$C_2H_4OCOCH_3$ | —$CH_2CH_2$— | —$CH_2CH_2$— | Do. |
| 94 | 2-Cl-4,6-di-$NO_2$ | —$COCH_3$ | 2-$OCH_3$ | —$C_2H_4Cl$ | —$CH_2CH_2$— | —$CH_2CH_2$— | Do. |
| 95 | 2-Cl-4,6-di-$NO_2$ | —$COCH_3$ | 2-$OCH_3$ | —$C_2H_4SO_2CH_3$ | —$CH_2CH_2$— | —$CH_2CH_2$— | Do. |

3,525,733

TABLE II—Continued

| Example No.: | (X)$_m$ | R$^1$ | R$^2$ | R$^3$ | R$^4$ | A | Color on polyesters |
|---|---|---|---|---|---|---|---|
| 96 | 2-Cl-4,6-di-NO$_2$ | —COCH$_3$ | 2-OCH$_3$ | —R$_4$—N(CO)$_2$A (succinimide ring) | —CH$_2$CH$_2$— | —CH$_2$CH$_2$— | Do. |
| 97 | 2-CN-4,6-di-NO$_2$ | —COCH$_3$ | 2-OCH$_3$ | —C$_2$H$_5$ | —CH$_2$CH$_2$— | —CH$_2$CH$_2$— | Do. |
| 98 | 2-CN-4,6-di-NO$_2$ | —COCH$_3$ | 2-CH$_3$ | —C$_2$H$_5$ | —CH$_2$CH$_2$— | —CH$_2$CH$_2$— | Do. |
| 99 | 2-CN-4,6-di-NO$_2$ | —COCH$_3$ | H | —C$_2$H$_5$ | —CH$_2$CH$_2$— | —CH$_2$CH$_2$— | Do. |
| 100 | 2-CN-4,6-di-NO$_2$ | —COCH$_3$ | H | —C$_2$H$_5$ | —CH$_2$CH$_2$— | —C$_6$H$_4$(CH$_3$)— | Do. |
| 101 | 2-CN-4,6-di-NO$_2$ | —COCH$_3$ | H | —C$_2$H$_5$ | —CH$_2$CH$_2$— | —C$_6$H$_4$(OCH$_3$)— | Do. |
| 102 | 2-CN-4,6-di-NO$_2$ | —COCH$_3$ | H | —C$_2$H$_5$ | —CH$_2$CH$_2$— | —CH=CH— | Do. |
| 103 | 2-CN-4,6-di-NO$_2$ | —COCH$_3$ | H | —C$_2$H$_5$ | —CH$_2$CH$_2$— | —CH(CH$_3$)—CH$_2$— | Do. |
| 104 | 2-CN-4,6-di-NO$_2$ | —COCH$_3$ | H | —C$_2$H$_5$ | —CH$_2$CH$_2$— | cyclohexenylene | Do. |
| 105 | 2-SO$_2$CH$_3$-4-NO$_2$ | —COCH$_3$ | H | —C$_2$H$_5$ | —CH$_2$CH$_2$— | —CH$_2$CH$_2$— | Violet. |
| 106 | 2-SO$_2$CH$_3$-4-NO$_2$ | —COCH$_3$ | H | —C$_2$H$_4$OCOCH$_3$ | —CH$_2$CH$_2$— | —CH$_2$CH$_2$— | Do. |
| 107 | 2-SO$_2$CH$_3$-4-NO$_2$ | —COOH$_3$ | H | —C$_2$H$_4$CONH$_2$ | —CH$_2$CH$_2$— | —CH$_2$CH$_2$— | Do. |
| 108 | 2-SO$_2$CH$_3$-4-NO$_2$ | —COCH$_3$ | H | —C$_2$H$_4$OCOCH$_3$ | —CH$_2$CH$_2$— | —CH$_2$CH$_2$— | Do. |
| 109 | 2-SO$_2$CH$_3$-4-NO$_2$ | —COCH$_3$ | H | —C$_2$H$_4$OCOC$_2$H$_5$ | —CH$_2$CH$_2$— | —CH$_2$CH$_2$— | Do. |
| 110 | 2,4-bis-SO$_2$CH$_3$ | —COCH$_3$ | 2-OCH$_3$ | —C$_2$H$_5$ | —CH$_2$CH$_2$— | —CH$_2$CH$_2$— | Do. |
| 111 | 2,4-bis-SO$_2$CH$_3$ | —COCH$_3$ | 2-OCH$_3$ | —C$_2$H$_5$ | —CH$_2$CH$_2$— | —CH$_2$CH(CH$_3$)CH$_2$— | Do. |
| 112 | 2-Cl-4-SO$_2$CH$_3$ | —COCH$_3$ | 2-OCH$_3$ | —C$_2$H$_5$ | —CH$_2$CH$_2$— | —CH$_2$CH(CH$_3$)CH$_2$— | Red. |
| 113 | 4-SO$_2$CH$_3$ | —COCH$_3$ | H | —C$_2$H$_5$ | —CH$_2$CH$_2$— | —CH$_2$CH$_2$— | Orange. |
| 114 | 4-SO$_2$CH$_3$ | —COCH$_3$ | H | —C$_2$H$_4$OCOC$_6$H$_5$ | —CH$_2$CH$_2$— | —CH$_2$CH$_2$— | Do. |
| 115 | 4-SO$_2$CH | —COCH$_3$ | H | —C$_2$H$_4$OCOC$_2$H$_5$ | —CH$_2$CH$_2$— | —CH$_2$CH$_2$— | Do. |
| 116 | 4-SO$_2$CH$_3$ | —COCH$_3$ | H | —C$_2$H$_4$COOCH$_3$ | —CH$_2$CH$_2$— | —CH$_2$CH$_2$— | Do. |
| 117 | 4-Cl | —COCH$_3$ | H | —C$_2$H$_5$ | —CH$_2$CH$_2$— | —CH$_2$CH$_2$— | Yellow. |
| 118 | 4-CH$_3$ | —COCH$_3$ | H | —C$_2$H$_5$ | —CH$_2$CH$_2$— | —CH$_2$CH$_2$— | Do. |
| 119 | 4-COOC$_2$H$_5$ | —COCH$_3$ | H | —C$_2$H$_5$ | —CH$_2$CH$_2$— | —CH$_2$CH$_2$— | Orange. |
| 120 | 4-SO$_2$NH$_2$ | —COCH$_3$ | H | —C$_2$H$_5$ | —CH$_2$CH$_2$— | —CH$_2$CH$_2$— | Do. |
| 121 | 4-CHO | —COCH$_3$ | H | —C$_2$H$_5$ | —CH$_2$CH$_2$— | —CH$_2$CH$_2$— | Do. |
| 122 | 4-CN | —COOCH$_3$ | H | —C$_2$H$_5$ | —CH$_2$CH$_2$— | —CH$_2$CH$_2$— | Do. |
| 123 | 2,4-di-CN | —COOCH$_3$ | H | —C$_2$H$_5$ | —CH$_2$CH$_2$— | —CH$_2$CH$_2$— | Red. |
| 124 | 2-COOCH$_3$-4-CN | —COOCH$_3$ | H | —C$_2$H$_5$ | —CH$_2$CH$_2$— | —CH$_2$CH$_2$— | Do. |
| 125 | 4-CF$_3$ | —COOCH$_3$ | H | —C$_2$H$_5$ | —CH$_2$CH$_2$— | —CH$_2$CH$_2$— | Orange. |
| 126 | 2-CF$_3$,4-NO | —COOCH$_3$ | H | —C$_2$H$_5$ | —CH$_2$CH$_2$— | —CH$_2$CH$_2$— | Red. |
| 127 | 4-COCH$_3$ | —COOCH$_3$ | H | —C$_2$H$_5$ | —CH$_2$CH— | —CH$_2$CH$_2$— | Orange. |
| 128 | 2-Cl-4-COCH$_3$ | —COOCH$_3$ | H | —C$_2$H$_5$ | —CH$_2$CH$_2$— | —CH$_2$CH$_2$— | Red. |

Example 129

To 2.28 g. 2 - amino - 6 - methylsulfonylbenzothiazole suspended in 24 ml. of water is added 26.2 g. com. $H_2SO_4$. After all the amine has dissolved, the solution is cooled and a solution of 0.84 g. $NaNO_2$ in 5.0 ml. com. $H_2SO_4$ is added portionwise below 0° C. The diazotization is stirred for 2 hours at about 0° C. and then is added to a solution of 3.03 g. 3 - acetamido - N - ethyl - N - β - succinimidoethylaniline in 75 ml. of 15% $H_2SO_4$, all below 10° C. The temperature is kept below 10° C. for 1 hour and then the coupling mixture is drowned with water. The dye is collected by filtration, washed with water, and air dried. It dyes polyester and cellulose acetate fibers pink and has excellent fastness properties. It has the formula:

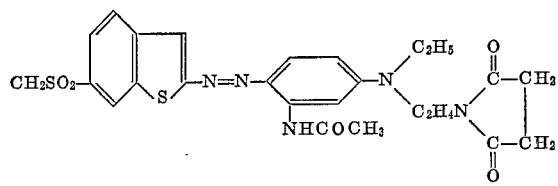

Example 130

1.95 g. 2 - amino - 6 - nitrobenzothiazole is diazotized as in Example 129 and coupled with 3.33 g. of the coupler from Example 6 in 75 ml. of 15% $H_2SO_4$. The dye is isolated in a similar manner. It dyes polyester and cellulose acetate brilliant violet shades.

Example 131

Sodium nitrate (0.76 g.) is added portionwise to 5 ml. conc. $H_2SO_4$. This solution is cooled in ice-bath and 10 ml. 1:5 acid is added, keeping the temperature below 15° C. This mixture is stirred at 0–5° C. and 1.75 g. 2-amino-6-cyanobenzothiazole is added, followed by 10 ml. 1:5 acid. The diazotization is stirred at 0–5° C. for 2 hours and is then added to a cold solution of 3.03 g. 3-acetamido - N - ethyl - N - β - succinimidoethylaniline in 100 ml. 1:5 acid. The coupling is buffered with solid ammonium acetate and allowed to react at ice-bath temperature for 2 hours. It is then drowned with water, filtered, washed with water, and air dried. The product dyes cellulose acetate and polyester fibers bright red. It has the structure:

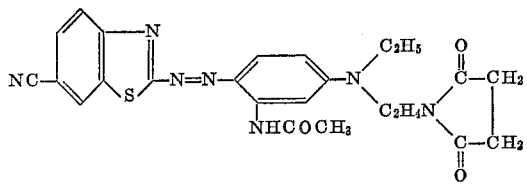

The compounds described in the examples of Table III conform to the formula

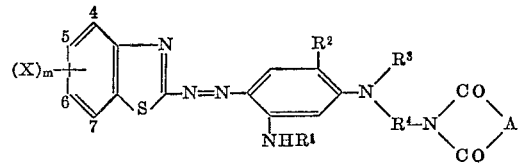

and are prepared by diazotizing a 2-aminothiazole with a coupling component of Formula III as described in Examples 129 through 131.

TABLE III

| Example No. | $(X)_m$ | $R^1$ | $R^2$ | $R^3$ | $R^4$ | A | Color on polyesters |
|---|---|---|---|---|---|---|---|
| 132 | 6-$NO_2$ | —$COCH_3$ | H | —$C_2H_5$ | —$CH_2CH_2$— | —$CH_2CH_2$— | Violet. |
| 133 | 6-$NO_2$ | —$COC_3H_7$ | H | —$C_2H_5$ | —$CH_2CH_2$— | —$CH_2CH_2$— | Do. |
| 134 | 6-$NO_2$ | —$SO_2CH_3$ | H | —$C_2H_5$ | —$CH_2CH_2$— | —$CH_2CH_2CH_2$— | Do. |
| 135 | 6-$NO_2$ | —CO—C₆H₅ | H | —$C_2H_5$ | —$CH_2CH_2$— | (cyclohexylene) | Do |
| 136 | 6-$NO_2$ | —CO—C₆H₅ | —$OCH_3$ | —$C_2H_5$ | —$CH_2CH_2$— | (cyclohexylene) | Do. |
| 137 | 6-$NO_2$ | —$CONHC_2H_5$ | —$OCH_3$ | —$C_2H_5$ | —$CH_2CH_2$— | (cyclohexylene) | Do. |
| 138 | 6-CN | —$COCH_3$ | H | —$CH_3$ | —$CH_2CH_2$— | CH=CH— | Red. |
| 139 | 6-CN | —$COCH_3$ | H | —$CH_3$ | —$CH_2CH_2$— | —$CH_2CH$—<br>$CH_3$ | Red. |
| 140 | 6-CN | —$COCH_3$ | H | —$C_2H_4CN$ | —$CH_2CH_2$— | —$CH_2CH$—<br>$CH_3$ | Red. |
| 141 | 6-CN | —$COCH_3$ | H | —$C_2H_4OCOCH_3$ | —$CH_2CH_2$— | —$CH_2CH$—<br>$CH_3$ | Red. |
| 142 | 4-Cl-6-CN | —$COCH_3$ | —$OCH_3$ | —$C_2H_5$ | —$CH_2CH_2$— | —$CH_2CH_2$— | Violet. |
| 143 | 4-Cl-6-CN | —$COCH_3$ | —$OCH_3$ | —$C_2H_5$ | —$CH_2CH_2CH_2$— | —$CH_2CH_2$— | Do. |
| 144 | 4-Cl-6-CN | —$COCH_3$ | —$OCH_3$ | —$C_2H_5$ | —$CH_2CH_2$—<br>OH | —$CH_2CH_2$— | Do. |

TABLE III—Continued

| Example No. | (X)m | R¹ | R² | R³ | R⁴ | A | Color on polyesters |
|---|---|---|---|---|---|---|---|
| 145 | 6-SCN | —COCH₃ | H | —C₂H₅ | —CH₂CH₂— | —CH₂CH₂— | Do. |
| 146 | 6-Cl | —COCH₃ | H | —C₂H₅ | —CH₂CH₂— | —CH₂CH₂— | Do. |
| 147 | 4,6-di-NO₂ | —COCH₃ | H | —C₂H₅ | —CH₂CH₂— | —CH₂CH₂— | Reddish-blue. |
| 148 | 6-SO₂CH₃ | —COCH₂CN | H | —C₂H₅ | —CH₂CH₂— | —CH₂CH₂— | Pink. |
| 149 | 6-SO₂CH₃ | —COCH₂OH | H | —C₂H₅ | —CH₂CH₂— | —CH₂CH₂— | Do. |
| 150 | 6-SO₂CH₃ | —COCH₂Cl | H | —C₂H₅ | —CH₂CH₂— | —CH₂CH₂— | Do. |
| 151 | 6-COOC₂H₅ | —COCH₃ | H | —C₂H₅ | —CH₂CH₂— | —CH₂CH₂— | Red. |
| 152 | 6-SO₂NH₂ | —COCH₃ | H | —C₂H₅ | —CH₂CH₂— | —CH₂CH₂— | Red. |
| 153 | 6-NHCOCH₃ | —COCH₃ | H | —C₂H₅ | —CH₂CH₂— | —CH₂CH₂— | Red. |
| 154 | None | —COCH₃ | H | —C₂H₄Cl | —CH₂CH₂— | —CH₂CH₂— | Red. |
| 155 | 6-CH₃ | —COCH₃ | H | —C₂H₄CONH₂ | —CH₂CH₂— | —CH₂CH₂— | Red. |
| 156 | 6-SO₂C₂H₄CN | —COCH₃ | H | —C₂H₅ | —CH₂CH₂— | —CH₂CH₂— | Pink. |
| 157 | 6-SO₂C₂H₄CN | —COCH₃ | 2-CH₃ | —C₂H₄COOCH₃ | —CH₂CH₂— | —CH₂CH₂— | Do. |
| 158 | 6-SO₂C₂H₄CN | —COCH₃ | 2-CH₃ | —C₂H₄SO₂CH | —CH₂CH₂— | —CH₂CH₂— | Do. |
| 159 | 6-CH₃S— | —COCH₃ | H | —C₂H₄SO₂CH | —CH₂CH₂— | —CH₂CH₂— | Red. |
| 160 | 6-CONH₂ | —COCH₃ | H | —C₂H₄SO₂CH₃ | —CH₂CH₂— | —CH₂CH₂— | Red. |
| 161 | 6-SO₂N(CH₃)₂ | —COCH₃ | 2-OCH₃ | —C₂H₄SO₂CH₃ | —CH₂CH₂— | —CH₂CH₂— | Violet. |
| 162 | 6-OCH₃ | —COCH₃ | H | —C₂H₅ | —CH₂CH₂— | —CH₂CH₂— | Red. |
| 163 | 5,6-di-OC₂H₅ | —COCH₃ | H | —C₂H₅ | —CH₂CH₂— | —CH₂CH₂— | Red. |

The water-insoluble azo compounds of the invention can be used for dyeing textile materials, including protein and synthetic polymer fibers, yarns and fabrics, giving a variety of fast bright red to blue shades, including orange, violet, red and scarlet, when applied thereto by conventional dyeing methods. The azo compounds have good affinity for cellulose ester, polyester, and nylon fibers. Since the compounds are water-insoluble they, of course, are free of water-solubilizing groups such as sulfo and carboxyl. In general, the dyes have good fastness, for example, to light, washing, gas (atmospheric fumes) and sublimation, when tested by methods such as are described in the A.A.T.C.C. Technical Manual, 1965 edition. As mentioned hereinbefore, the compounds possess excellent fastness to sublimation and/or light when dyed on polyesters.

The compounds of the invention can be used for dyeing hydrophobic fibers such as linear polyester, cellulose ester, acrylic, polyamide, etc., fibers in the manner described in U.S. Pats. 2,880,050; 2,757,064; 2,782,187 and 3,043,827. The following example illustrates a method by which the azo compounds of the invention can be used to dye polyester textile materials.

Example 164

An amount of 0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of "Dacronyx" (a chlorinated benzene emulsion) are added and 10 grams of a textile fabric made of poly(ethylene terephthalate) fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried.

When the compounds of the invention are used to dye polyamide textile materials, the above procedures can be employed except the "Dacronyx" dyeing assistant need not be used. When cellulose acetate fibers are dyed with the compounds, the above procedure can be followed omitting the "Dacronyx" dyeing assistant and carrying out the dyeing at 80° C. for one hour rather than at the boil.

The compounds of the invention can also be applied to polyester textile materials by the heat fixation technique of dyeing. This procedure is described in U.S. Pat. 2,663,612 and in the American Dyestuff Reporter, 42, 1 (1953). Coloration can also be effected, for example, by incorporating the compounds into the spinning dope or melt and spinning the fiber as usual.

Polymeric linear polyester materials of the terephthalate type are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010; 2,957,745 and 2,989,363, for example, can be dyed. The linear aromatic polyester materials specifically named have a melting point of at least 200° C.

Examples of the polyamide fibers that can be dyed with the compounds of the invention are those consisting of nylon 66, made by the polymerization of adipic acid and hexamethylenediamine, nylon 6, prepared from epsilon-aminocaproic acid lactam, and nylon 8. The cellulose acetate fibers that can be dyed with the compounds of the invention include fibers consisting of either cellulose triacetate or partially hydrolyzed cellulose acetate.

The invention has been described in considerable detail with particular reference to certain preferred embodiments thereof, but it will be understood that variations and modifications can be effected within the spirit and scope of the invention as described above.

We claim:
1. A water-insoluble monoazo compound having the formula

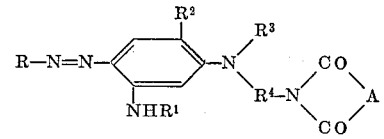

wherein R represents
(a) a phenyl radical having the formula

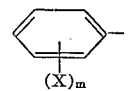

in which X is hydrogen, lower alkyl, lower alkoxy, lower alkanoyl, lower alkanoylamino, nitro, chlorine, bromine, cyano, lower alkylsulfonyl, lower alkoxycarbonyl, carbamoyl, N-lower alkylcarbamoyl, N,N - di - lower alkylcarbamoyl, thiocyanato, lower alkylthio, sulfamoyl, N-lower alkylsulfamoyl, N,N-di-lower alkylsulfamoyl, formyl, or trifluoromethyl, and m is 1, 2 or 3;

(b) a 2-thiazolyl radical having the formula $$(X)_n \underset{S}{\overline{\underset{\phantom{x}}{\bigg\lfloor}}} \hspace{-4pt} \underset{\phantom{x}}{\overset{N}{\bigg\rceil}}$$

in which X is hydrogen, lower alkyl, lower alkoxy, lower alkanoyl, lower alkanoylamino, nitro, chlorine, bromine, cyano, lower alkylsulfonyl, lower alkoxycarbonyl, carbamoyl, N-lower alkylcarbamoyl, N,N - di - lower alkylcarbamoyl, thiocyanato, lower alkylthio, sulfamoyl, N-lower alkylsulfamoyl, N,N-di-lower alkylsulfamoyl, phenyl or trifluoromethyl, and n is 1 or 2; or (c) a 2-benzothiazolyl radical having the formula $$(X)_m \underset{S}{\overline{\underset{\phantom{x}}{\bigcirc}}} \hspace{-4pt} \underset{\phantom{x}}{\overset{N}{\bigg\rceil}}$$

in which X is hydrogen, lower alkyl, lower alkoxy, lower alkanoyl, lower alkanoylamino, nitro, chlorine, bromine, cyano, lower alkylsulfonyl, cyanoethylsulfonyl, lower alkoxycarbonyl, carbamoyl, N-lower alkylcarbamoyl, N,N-di-lower alkylcarbamoyl, thiocyanato, lower alkylthio, sulfamoyl, N-lower alkylsulfamoyl, or N,N-di-lower alkylsulfamoyl, and m is 1, 2 or 3;

$R^1$ represents lower alkanoyl; lower alkanoyl substituted with cyano, hydroxy, chlorine, bromine, lower alkanoyloxy, or lower alkoxy; cyclohexylcarbonyl; benzoyl; benzoyl substituted with lower alkyl, lower alkoxy, chlorine, bromine, or nitro; lower alkoxycarbonyl; cyclohexyloxycarbonyl; phenoxycarbonyl; phenoxycarbonyl substituted with lower alkyl, lower alkoxy, chlorine, bromine, or nitro; lower alkylsulfonyl; phenylsulfonyl; phenylsulfonyl substituted with lower alkyl, lower alkoxy, chlorine, bromine, or nitro; carbamoyl; lower N-alkylcarbamoyl; N-phenylcarbamoyl; or N-phenylcarbamoyl substituted with lower alkyl, lower alkoxy, chlorine, bromine, or nitro;

$R^2$ represents hydrogen, lower alkyl, lower alkoxy, chlorine, or bromine;

$R^3$ represents hydrogen; lower alkyl; lower alkyl substituted with hydroxy, lower alkoxy, chlorine, bromine, cyano, lower cyanoalkoxy, lower alkanoyloxy, lower alkylsulfonyl, lower alkoxycarbonyloxy, carbamoyl, lower alkylcarbamoyl, phenoxy, or lower alkylsulfonamido; benzyl; cyclohexyl; or cyclohexyl substituted with lower alkyl;

$R^4$ represents lower alkylene, lower hydroxyalkylene, lower chloroalkylene, lower bromoalkylene, or lower alkanoyloxy-lower-alkylene; and A represents ethylene, lower alkyl substituted ethylene, propylene, lower alkyl substituted propylene, vinylene, lower alkyl substituted vinylene, o-phenylene, lower alkyl-o-phenylene, lower alkoxy-o-phenylene, chloro - o - phenylene, bromo-o-phenylene, nitro-o-phenylene, or bicyclo[2.2.1]-5-heptene-2,3-diyl.

2. A compound according to claim 1 wherein $R^3$ represents lower alkyl or lower alkyl substituted with chlorine, bromine, hydroxy, cyano, or lower alkanoyloxy; and $R^4$ represents lower alkylene.

3. A compound according to claim 1 wherein R represents a phenyl radical having the formula $$Q^1 \underset{\phantom{x}}{\overline{\bigcirc}} \hspace{-4pt} \underset{Q^2}{\overset{Q}{\phantom{x}}}$$

wherein Q, $Q^1$ and $Q^2$ are the same or different and each represents cyano, hydrogen, nitro, chlorine, bromine, lower alkanoyl, lower alkylsulfonyl, or sulfamoyl;

$R^1$ represents lower alkanoyl, lower alkoxycarbonyl, lower alkylsulfonyl, phenylsulfonyl, phenylsulfonyl substituted with lower alkyl, or lower N-alkylcarbamoyl;

$R^2$ represents hydrogen, lower alkyl, or lower alkoxy;

$R^3$ represents lower alkyl;

$R^4$ represents lower alkylene; and

A represents ethylene or o-phenylene.

4. A compound according to claim 1 wherein R represents a 2-thiazolyl radical having the formula $$Q^3 \underset{S}{\overline{\underset{\phantom{x}}{\bigg\lfloor}}} \hspace{-4pt} \underset{\phantom{x}}{\overset{N}{\bigg\rceil}}$$

wherein $Q^3$ represents nitro, chlorine, bromine, cyano, or alkylsulfonyl;

$R^1$ represents lower alkanoyl, lower alkoxycarbonyl, lower alkylsulfonyl, phenylsulfonyl, phenylsulfonyl substituted with lower alkyl, or lower N-alkylcarbamoyl;

$R^2$ represents hydrogen, lower alkyl or lower alkoxy;

$R^3$ represents lower alkyl;

$R^4$ represents lower alkylene; and

A represents ethylene or o-phenylene.

5. A compound according to claim 1 wherein R represents a 2-benzothiazolyl radical having the formula $$Q^4 \underset{S}{\overline{\underset{\phantom{x}}{\bigcirc}}} \hspace{-4pt} \underset{\phantom{x}}{\overset{N}{\bigg\rceil}}$$

wherein $Q^4$ represents nitro, cyano, lower alkylsulfonyl, lower alkoxycarbonyl or thiocyanato;

$R^1$ represents lower alkanoyl, lower alkoxycarbonyl, lower alkylsulfonyl, phenylsulfonyl, phenylsulfonyl substituted with lower alkyl, or lower N-alkylcarbamoyl;

$R^2$ represents hydrogen, lower alkyl or lower alkoxy;

$R^3$ represents lower alkyl;

$R^4$ represents lower alkylene; and

A represents ethylene or o-phenylene.

6. A compound according to claim 1 having the formula $$O_2N-\bigcirc\underset{Cl}{}-N=N-\bigcirc\underset{NHCOCH_3}{}-N\underset{C_2H_4N}{\overset{C_2H_5}{\diagup}}\underset{}{\diagdown}\underset{\overset{\|}{O}}{\overset{\overset{O}{\|}}{\underset{C-CH_2}{C-CH_2}}}$$

7. A compound according to claim 1 having the formula $$O_2N-\bigcirc\underset{Cl}{}-N=N-\bigcirc\underset{NHCOCH_3}{}-N\underset{C_2H_4N}{\overset{C_2H_5}{\diagup}}\underset{}{\diagdown}\underset{\overset{\|}{O}}{\overset{\overset{O}{\|}}{\underset{C-CH_2}{C-CH_2}}}$$

8. A compound according to claim 1 having the formula $$O_2N-\bigcirc\underset{SO_2CH_3}{}-N=N-\bigcirc\underset{NHCOOC_2H_5}{}-N\underset{C_2H_4N}{\overset{C_2H_5}{\diagup}}\underset{}{\diagdown}\underset{\overset{\|}{O}}{\overset{\overset{O}{\|}}{\underset{C-CH_2}{C-CH_2}}}$$

9. A compound according to claim 1 having the formula

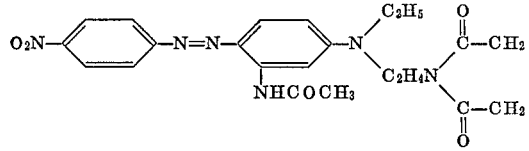

10. A compound according to claim 1 having the formula

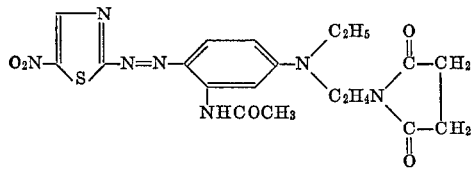

11. A compound according to claim 1 having the formula

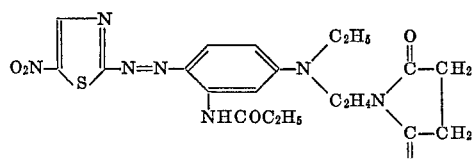

12. A compound according to claim 1 having the formula

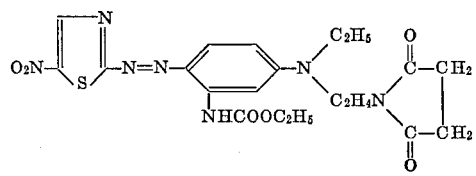

13. A compound according to claim 1 having the formula

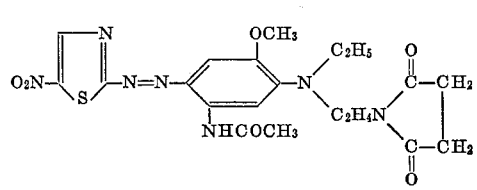

14. A compound according to claim 1 having the formula

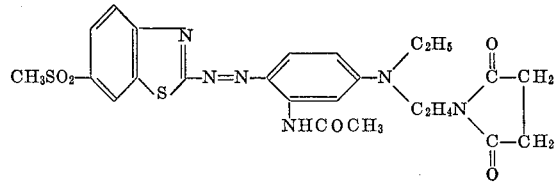

15. A compound according to claim 1 having the formula

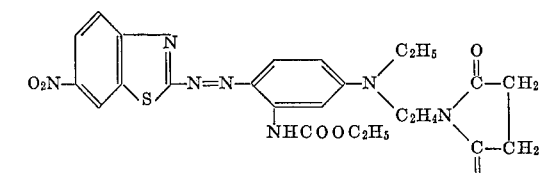

16. A compound according to claim 1 having the formula

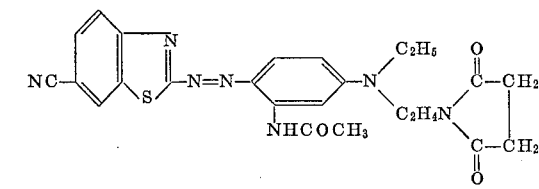

References Cited

UNITED STATES PATENTS

| | | | |
|---|---|---|---|
| 3,148,178 | 9/1964 | Wallace et al. | 260—152 |
| 3,148,180 | 9/1964 | Straley et al. | 260—158 |
| 3,329,669 | 7/1967 | Sartori | 260—158 |
| 3,342,799 | 9/1967 | Wallace et al. | 260—152 |
| 3,349,076 | 10/1967 | Weaver et al. | 260—152 |
| 3,402,166 | 9/1968 | Heckl et al. | 260—152 |
| 3,415,810 | 12/1968 | Straley et al. | 260—152 XR |
| 3,418,310 | 12/1968 | Dale et al. | 260—158 |

FLOYD D. HIGEL, Primary Examiner

U.S. Cl. X.R.

8—41, 50; 117—138.8; 260—37, 158, 281, 326

PO-1050
(5/69)

UNITED STATES PATENT OFFICE
CERTIFICATE OF CORRECTION

Patent No. 3,525,733    Dated August 25, 1970

Inventor(s) Max A. Weaver and James M. Straley

It is certified that error appears in the above-identified patent and that said Letters Patent are hereby corrected as shown below:

Column 1, line 21, after "blue" insert ---on---.

Column 1, line 47, "alkylcarbomoyl" should be ---alkyl-carbamoyl---.

Column 2, lines 25 through 29, the middle formula should be:

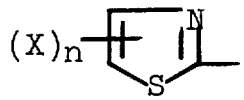

Column 4, lines 33 through 39, the middle formula should be:

Column 5, line 29, "NHO$_3$(d=1.42)" should be ---HNO$_3$(d=1.42)---.

Column 5, lines 63 through 68, the formula should be:

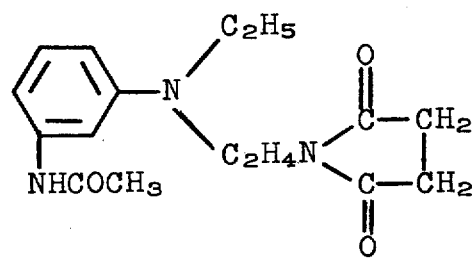

PO-1050
(5/69)

UNITED STATES PATENT OFFICE
CERTIFICATE OF CORRECTION

Patent No. __3,525,733__  Dated __August 25, 1970__

Inventor(s) __Max A. Weaver and James M. Straley__

It is certified that error appears in the above-identified patent and that said Letters Patent are hereby corrected as shown below:

Page 2

Column 8, lines 1 through 8, the formula should be:

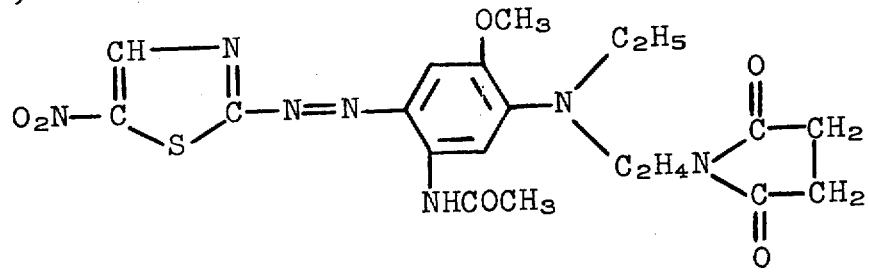

Column 8, lines 15 through 22, the formula should be:

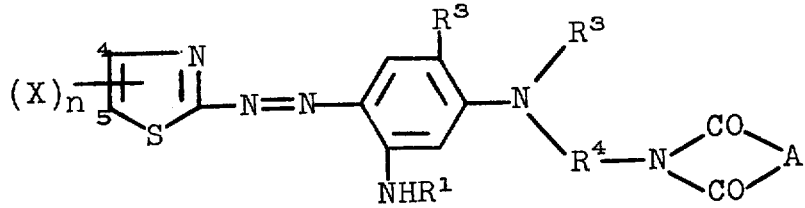

Column 12, lines 10 through 17, the formula should be:

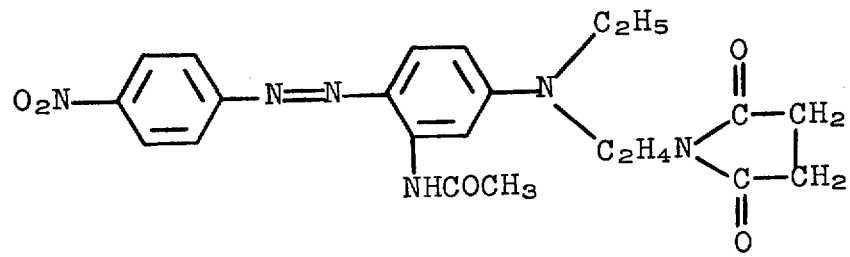

PO-1050
(5/69)

UNITED STATES PATENT OFFICE
CERTIFICATE OF CORRECTION

Patent No. __3,525,733__ Dated __August 25, 1970__

Inventor(s) __Max A. Weaver and James M. Straley__

It is certified that error appears in the above-identified patent and that said Letters Patent are hereby corrected as shown below:

Page 3

Column 12, lines 27 through 31, the formula should be:

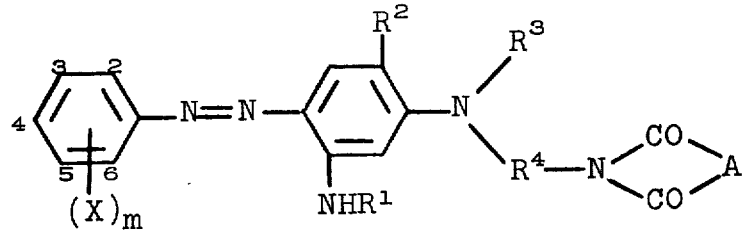

Columns 13 and 14, Example 105, in Table II under the heading "$(X)_m$", "2-SO$_2$CH$_2$-4-NO$_2$" should be ---2-SO$_2$CH$_3$-4-NO$_2$---.

Columns 17 and 18, Examples 158 and 159, in Table II under the heading "R$^3$", "-C$_2$H$_4$SO$_2$CH" should be --- -C$_2$H$_4$SO$_2$CH$_3$---.

Column 19, Claim 1, lines 18 through 22, the formula should be:

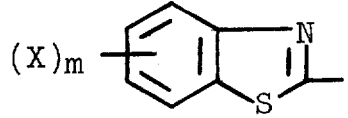

Column 20, Claim 7, lines 58 through 65, the formula should be:

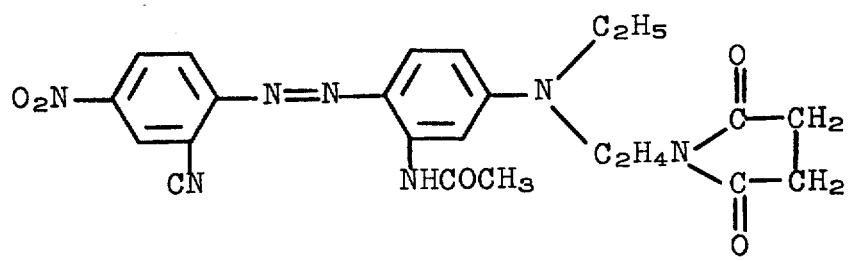

PO-1050
(5/69)

UNITED STATES PATENT OFFICE
CERTIFICATE OF CORRECTION

Patent No. __3,525,733__ Dated __August 25, 1970__

Inventor(s) __Max A. Weaver and James M. Straley__

It is certified that error appears in the above-identified patent and that said Letters Patent are hereby corrected as shown below:

Column 21, Claim 9, lines 2 through 8, the formula should be:

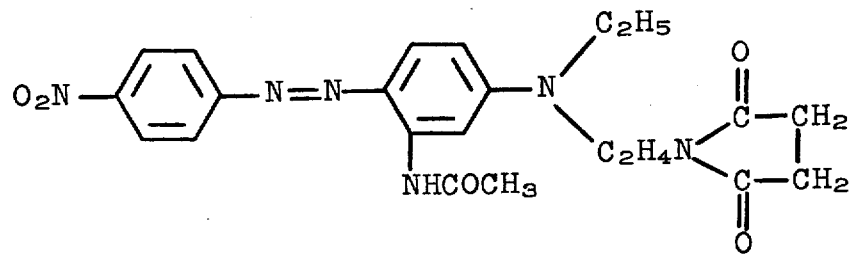

Signed and sealed this 25th day of May 1971.

(SEAL)
Attest:

EDWARD M. FLETCHER, JR.
Attesting Officer

WILLIAM E. SCHUYLER, JR.
Commissioner of Patents